(12) United States Patent
Nagashima

(10) Patent No.: US 8,808,899 B2
(45) Date of Patent: Aug. 19, 2014

(54) CELL CASE AND STRUCTURE FOR ATTACHING CELL CASE

(75) Inventor: Tomio Nagashima, Ayase (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/984,401

(22) PCT Filed: Dec. 15, 2011

(86) PCT No.: PCT/JP2011/079102
§ 371 (c)(1),
(2), (4) Date: Aug. 8, 2013

(87) PCT Pub. No.: WO2012/111231
PCT Pub. Date: Aug. 23, 2012

(65) Prior Publication Data
US 2013/0316214 A1    Nov. 28, 2013

(30) Foreign Application Priority Data
Feb. 16, 2011 (JP) ................................. 2011-031005

(51) Int. Cl.
*H01M 10/50* (2006.01)
*H01M 2/02* (2006.01)
*H01M 2/10* (2006.01)

(52) U.S. Cl.
CPC ........ *H01M 2/1016* (2013.01); *H01M 2220/20* (2013.01); *H01M 2/0292* (2013.01); *H01M 10/5016* (2013.01); *Y02E 60/12* (2013.01); *H01M 2/1022* (2013.01); *H01M 10/5046* (2013.01); *H01M 2/1072* (2013.01); *H01M 10/5004* (2013.01); *H01M 2/1094* (2013.01)
USPC ............................ 429/120; 429/100; 429/163

(58) Field of Classification Search
CPC ............ H01M 2/0292; H01M 2/1016; H01M 2/1022; H01M 2/1072; H01M 2/1094; H01M 10/5004; H01M 10/5016; H01M 10/5046
USPC ................................. 429/120, 163, 185, 100
See application file for complete search history.

(56) References Cited

U.S. PATENT DOCUMENTS

| 2007/0292751 A1* | 12/2007 | Cherng et al. | 429/120 |
| 2011/0008665 A1* | 1/2011 | Yoon et al. | 429/120 |
| 2011/0045333 A1* | 2/2011 | Kim et al. | 429/120 |

(Continued)

FOREIGN PATENT DOCUMENTS

| JP | S63175355 A | 7/1988 |
| JP | H10-333782 A | 12/1998 |

(Continued)

Primary Examiner — Stewart Fraser
(74) Attorney, Agent, or Firm — Young Basile

(57) ABSTRACT

A cell case is provided which maintains cell temperature low by reducing heat reception during no power generation, while ensuring heat dissipation performance during generating power, and which is capable of suppressing reduction of cell capacity due to thermal degradation. A structure for attaching the cell case is also provided. The cell case has a sealed structure and houses a battery module. The cell case has a supporting mechanism which forms a space between the outer surface of the battery module and the inner surface of the case. A first cover layer has a radiation emissivity larger than that of the outer surface of the battery module and is disposed on the outer surface of the cell module. A second cover layer has a radiation emissivity larger than that of the inner surface of the case and is disposed on the inner surface of the case.

12 Claims, 7 Drawing Sheets

(56) References Cited

U.S. PATENT DOCUMENTS

2011/0177366 A1*   7/2011  Nagasaki et al. .............. 429/83
2011/0244296 A1*  10/2011  Okuda et al. ................. 429/120

FOREIGN PATENT DOCUMENTS

| | | |
|---|---|---|
| JP | 2003-308812 A | 10/2003 |
| JP | 2004-304881 A | 10/2004 |
| JP | 2007-134308 A | 5/2007 |
| JP | 2008-130729 A | 6/2008 |
| JP | 2008-300088 A | 12/2008 |
| JP | 2009-259748 A | 11/2009 |
| JP | 2009-295381 A | 12/2009 |
| JP | 2011-210619 A | 10/2011 |
| WO | WO 2010058587 A1 * | 5/2010 |

* cited by examiner

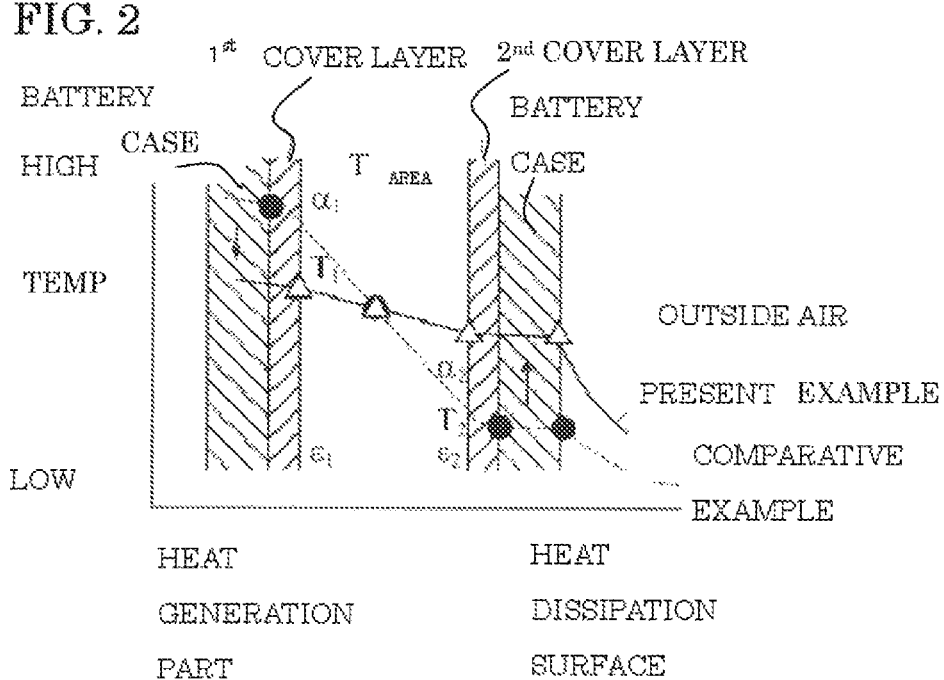

FIG. 2

EQUATION 1: CONVECTIVE HEAT TRANSFER $$q = \alpha_1 \cdot (T_1 - T_{AREA})$$

$$\alpha_1 = 0.54 \cdot (Gr \cdot Pr)^{1/4} \cdot \lambda / L$$

EQUATION 2: RADIATIVE HEAT TRANSFER $$q = \frac{\sigma(T_1^4 - T_2^4)}{\frac{1}{\varepsilon_1} + \frac{1}{\varepsilon_2} - 1}$$

- $q$ : HEAT TRANSFER AMOUNT PER UNIT AREA
- $\alpha_1$ : HEAT TRANSFER RATE
- $T_1$ : ABS. TEMP OF OUTER SURFACE OF BAT. MODULE
- $T_2$ : ABS. TEMP OF INNER SURFACE OF BAT. MODULE
- $T_{AREA}$ : ABS. TEMP OF AREA
- $Gr$ : GRASHOF NUMBER
- $Pr$ : PRANDTLE NUMBER
- $\lambda$ : HEAT CONDUCTIVITY
- $L$ : REPRESENTATIV LENGTH OF HEAT TRANS SURFACE
- $\sigma$ : STEPHAN-BOLTZMANN'S CONST.
- $\varepsilon_1$ : EMMISIVITY OF OUTER SURFACE OF BAT. MODULE
- $\varepsilon_2$ : EMMISIVITY OF INNER SURFACE OF BAT. MODULE

FIG. 3

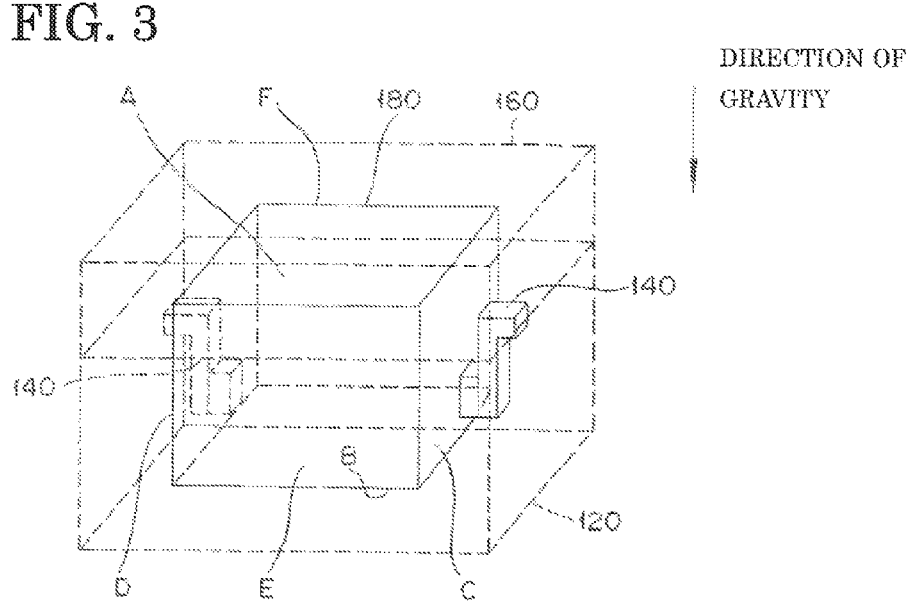

DIRECTION OF GRAVITY

FIG. 4

| | DISPOSED SURFACE WITH FIRST COVER LAYER | NUMBER OF DISPOSED SURFACES | HEAT TRANSFER RATE WHEN RECEIVING OUTSIDE AIR TEMP. (W/m2· k, TEMP°C) EQ.3 | | | | | | |
|---|---|---|---|---|---|---|---|---|---|
| | | | SURFACE A (TOP SURFACE) | SURFACE B (BOTTOM SURFACE) | SURFACE C (SUPPORT SURFACE) | SURFACE D (SUPPORT SURFACE) | SURFACE E (NON-SUPP SURFACE) | SURFACE F (NON SUPP SURFACE) | OVERALL (EQ. 4) |
| 1st EMBODIMENT | SURFACE C | 1 | 3.0 | 3.4 | 4.1 | 3.4 | 3.3 | 3.3 | 20.6 |
| 2nd EMBODIMENT | ALL SURFACES | 6 | 3.7 | 4.0 | 4.1 | 4.0 | 4.0 | 4.1 | 23.8 |
| 3rd EMBODIMENT | SURFACES E, F | 2 | 3.0 | 3.4 | 3.5 | 3.4 | 4.0 | 4.1 | 21.3 |
| 4th EMBODIMENT | SURFACE A | 1 | 3.7 | 3.4 | 3.5 | 3.4 | 3.3 | 3.3 | 20.6 |
| COMPARATIVE EXAMPLE 1 | NOT DISPOSED, SAME STRUCTURE AS EMBODIMENT | 0 | 3.0 | 3.4 | 3.5 | 3.4 | 3.3 | 3.3 | 19.9 |
| COMPARATIVE EXAMPLE 2 | NOT DISPOSED, SURFACE B IN CONTCT (ATTACHED) | 0 | 3.0 | 15.0 | 3.5 | 3.4 | 3.3 | 3.3 | 31.5 |

EQ. 3) HEAT TRANSFER RATE (W/m2· k) = OUTPUT DENSITY (EQ.5)/ (DUMMY SAT. MODULE TEMP. - OUTSIDE AIR TEMP.)

EQ. 4) OVERALL HEAT TRANSFER RATE (W/m2· k ) = SURFACE A HEAT TRANSFER RATE + SURFACE B HEAT TRANSFER RATE + SURACE F HEAT TRANSFER RATE

EQ. 5) OUTPUT DENSITY (W/m2) = OUTPUT (W)/ AREA (m2)

FIG. 5

| | DISPOSED SURFACE WITH FIRST COVER LAYER LAYER | NUMBER OF DISPOSED SURFACES | HEAT TRANSFER RATE AT HIGH OUTPUT (70 °C) (W/m$^2$· k, TEMP°C) | | | | | | |
|---|---|---|---|---|---|---|---|---|---|
| | | | SURFACE A (TOP SURFACE) | SURFACE B (BOTTOM SURFACE) | SURFACE C (SUPPORT SURFACE) | SURFACE D (SUPPORT SURFACE) | SURFACE E (NON-SUPP SURFACE) | SURFACE F (NON SUPP SURFACE) | OVERALL |
| 1st EMBODIMENT | SURFACE C | 1 | 3.1 | 3.5 | 4.7 | 3.4 | 3.4 | 3.4 | 21.5 |
| 2nd EMBODIMENT | ALL SURFACES | 6 | 4.3 | 4.7 | 4.7 | 4.7 | 4.7 | 4.8 | 27.9 |
| 3rd EMBODIMENT | SURFACES E, F | 2 | 3.1 | 3.5 | 3.5 | 3.4 | 4.7 | 4.8 | 23.0 |
| 4th EMBODIMENT | SURFACE A | 1 | 4.3 | 3.5 | 3.5 | 3.4 | 3.4 | 3.4 | 21.5 |
| COMPARATIVE EXAMPLE 1 | NOT DISPOSED, SAME STRUCTURE AS EMBODIMENT | 0 | 3.1 | 3.5 | 3.5 | 3.4 | 3.4 | 3.4 | 20.3 |
| COMPARATIVE EXAMPLE 2 | NOT DISPOSED, SURFACE B IN CONTCT (ATTACHED) | 0 | 3.1 | 15.0 | 3.5 | 3.5 | 3.4 | 3.4 | 32.0 |

FIG. 6

| | DISPOSED SURFACE WITH FIRST COVER LAYER LAYER | NUMBER OF DISPOSED SURFACES | ACTUAL TEMP. AT HIGH OUTPUT (70 °C) (°C) | | | | | |
|---|---|---|---|---|---|---|---|---|
| | | | SURFACE A (TOP SURFACE) | SURFACE B (BOTTOM SURFACE) | SURFACE C (SUPPORT SURFACE) | SURFACE D (SUPPORT SURFACE) | SURFACE E (NON-SUPP SURFACE) | SURFACE F (NON SUPP SURFACE) |
| 1st EMBODIMENT | SURFACE C | 1 | 76.5 | 68.6 | 60.6 | 68.5 | 68.5 | 68.6 |
| 2nd EMBODIMENT | ALL SURFACES | 6 | 64.2 | 61.0 | 60.6 | 61.0 | 60.8 | 60.3 |
| 3rd EMBODIMENT | SURFACES E, F | 2 | 76.5 | 68.6 | 67.4 | 68.5 | 60.8 | 60.3 |
| 4th EMBODIMENT | SURFACE A | 1 | 64.2 | 68.6 | 67.4 | 68.5 | 68.5 | 68.6 |
| COMPARATIVE EXAMPLE 1 | NOT DISPOSED, SAME STRUCTURE AS EMBODIMENT | 0 | 76.5 | 68.6 | 67.4 | 68.5 | 68.5 | 68.6 |
| COMPARATIVE EXAMPLE 2 | NOT DISPOSED, SURFACE B IN CONTCT (ATTACHED) | 0 | 76.0 | 58.0 | 66.5 | 67.2 | 67.7 | 67.3 |

FIG. 7

FIG. 8
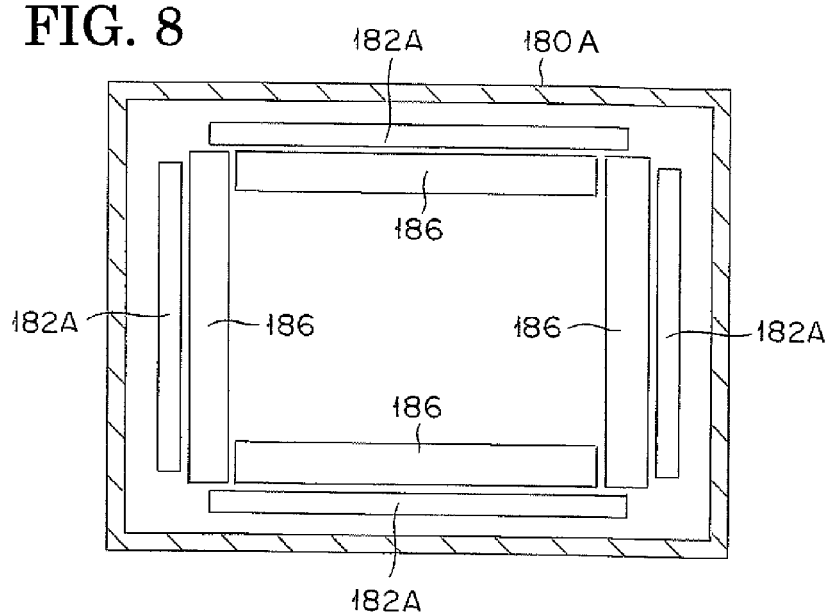
FIG. 9    COMPARATIVE EXAMPLE 1
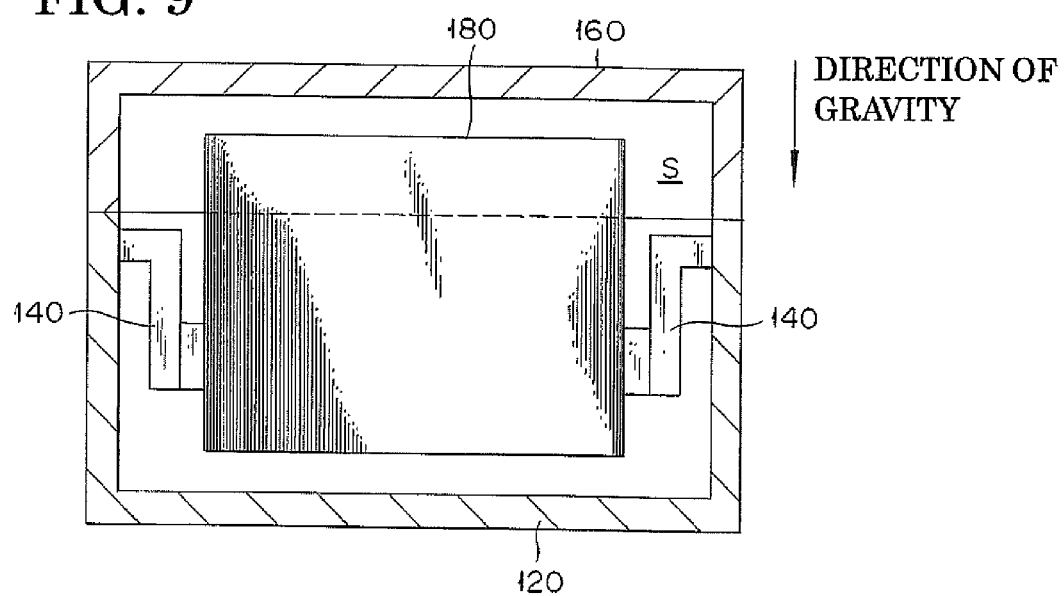

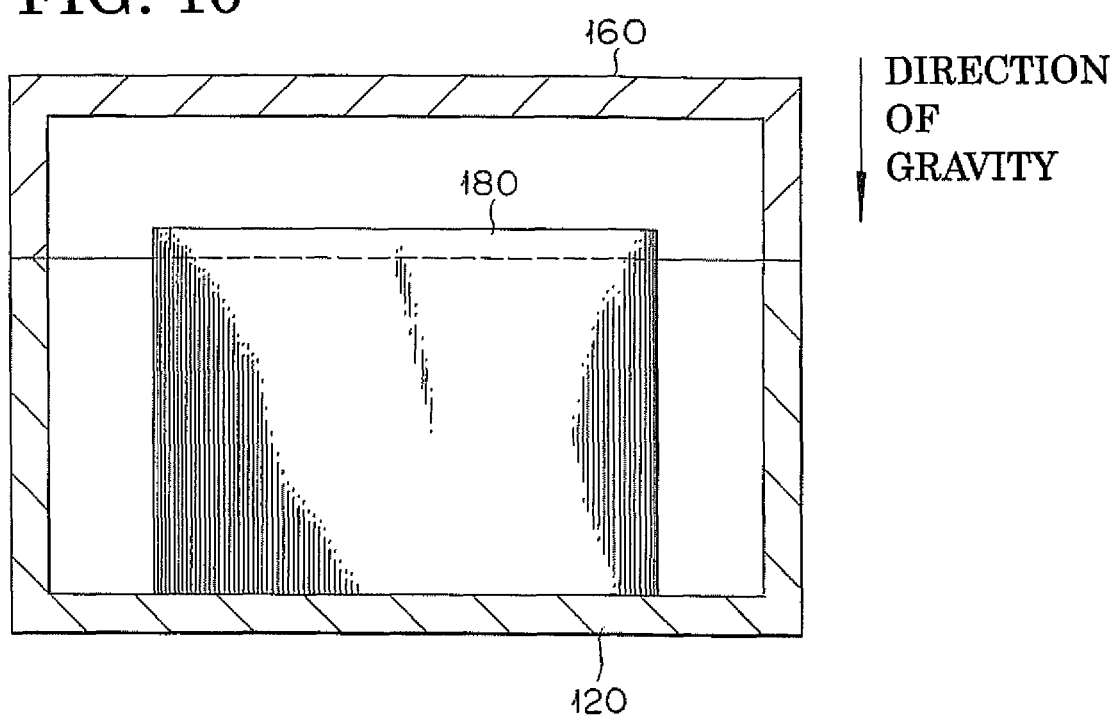
FIG. 10 COMPARATIVE EXAMPLE 2

CELL CASE AND STRUCTURE FOR ATTACHING CELL CASE

TECHNICAL FIELD

The present invention relates to a cell case and a mounting structure for a cell case.

BACKGROUND

To ensure insulating properties when submerged, although various cell cases of sealed structure have been proposed, it has been the issue to suppress capacity loss due to thermal degradation (reduction of cell life) of the cell accommodated inside. The radiation performance has been improved for the cell which becomes hot due to heat generated during power generation by providing a fin structure outside the housing (e.g., Japanese Patent Application No. JP 2004-304881 A), conducting heat to a metal plate of the housing (e.g., Japanese Application No. H10-333782), or making the outer surface of the housing to be of high emissivity (e.g., Japanese Patent Application No. JP2008-130729).

However, despite the radiation performance being secured during use (power generation), a cell case is subject to be heated in an unused state (non-power generation state) in the daytime by receiving heat at high outside air temperature. The cell temperature consequently rises and thermal degradation occurs. Specifically, when the cell temperature in unused state is higher than the outside air temperature, it is difficult to suppress to receive heat from outside so that there has been a problem that the cell capacity decreases despite non-use of the cell.

BRIEF SUMMARY

The present invention has been made in order to solve the problems associated with the prior art described above, while ensuring the heat dissipation performance during the use (power generation) and reducing the heat receiving during an unused time (non-power generation) by using a mounting structure to the battery case to maintain low cell temperature in which the cell can be suppressed from lowering the capacity due to the thermal degradation.

One aspect of the present invention for achieving the above object is a sealed cell case which houses or accommodates a cell module or battery module having at least one cell. The battery module comprises a supporting mechanism for supporting the battery module, thereby forming a space between the outer surface of the battery module and inner surface of the battery case, a first cover layer disposed on the outer surface of the battery module and having a higher thermal radiation coefficient or emissivity than that of the outer surface of the battery module, and a second cover layer disposed on the inner surface of the battery case having a higher thermal radiation coefficient or emissivity than that of the inner surface of the battery case. The first cover layer and the second cover layer are opposed to each other at least partly through the space.

Another aspect of the present invention for achieving the above object is a mounting structure to the battery case of sealed structure that accommodates a battery module having at least one cell or battery, wherein the battery case comprises a supporting mechanism for supporting the battery module, thereby forming a space between the outer surface of the battery module and inner surface of the battery case, a first cover layer disposed on the outer surface of the battery module and having a higher thermal radiation coefficient or radiation emissivity than that of the outer surface of the battery module, and a second cover layer disposed on the inner surface of the battery case having a higher radiation coefficient or radiation emissivity than that of the inner surface of the battery case. The first cover layer and the second cover layer are opposed to each other at least partly through the space. In addition, the battery module has a pair of opposing surfaces opposed to each other and a wall surface which connects the pair of opposing surfaces, wherein the first cover layer is disposed on at least one of the pair of opposing surfaces, and the supporting mechanism is provided on the wall surface. Also, with respect to the direction of gravity, the one of the pair of the opposing surfaces is positioned above while the other of said pair of opposing surfaces is positioned below so as to be attached to the battery case.

Still another aspect of the present invention for achieving the above object is a mounting structure to the battery case of sealed structure that accommodates a battery module having at least one cell or battery, wherein the battery case comprises a supporting mechanism for forming a space between the outer surface of the battery module and the inner surface of the battery case, a first cover layer disposed on the outer surface of the battery module and having a higher thermal radiation coefficient or radiation emissivity than that of the outer surface of the battery module, and a second cover layer disposed on the inner surface of the battery case having a higher radiation coefficient or radiation emissivity than that of the inner surface of the battery case, wherein the first cover layer and the second cover layer are opposed to each other at least partly through the space. In addition, the battery module has a pair of opposing surface portions opposed to each other and a wall surface which connects the pair of opposing surfaces, wherein the first cover layer is disposed on one of the pair of opposing surfaces. Also, with respect to the direction of gravity, the one of the pair of the opposing surfaces is positioned above while the other of said pair of opposing surfaces is positioned below so as to be attached to the battery case.

According to the present invention, because the outer surface of the battery module and the inner surface of the battery case respectively have a cover layer of radiation coefficient or emissivity higher than the emissivity of the associated base material, the heat dissipation at a high temperature is improved and the dissipation properties of the battery subjected to high temperature due to power generation will be secured. In addition, because of a space provided between the outer surface of the battery module and the inner surface of the battery case for reduction of heat receipt, the increase in battery temperature by a heat receiving during non-power generation where the ambient temperature is higher than the battery temperature in the daytime. Therefore, by securing dissipation performance during use (i.e. power generation) while reducing the heat receipt or absorption during non-use (i.e. non-power generation), such a battery case or an attachment structure for the battery case may be provided which maintains the battery temperature low and may suppress reduction in battery capacity due to thermal deterioration or degradation.

By reference to the preferred embodiments illustrated in the accompanying drawings and the following description, other objects, features and characteristics according to the present invention will become more apparent.

BRIEF DESCRIPTION OF THE DRAWINGS

The description herein makes reference to the accompanying drawings wherein like reference numerals refer to like parts throughout the several views, and wherein:

FIG. 2 is a conceptual diagram for explaining the radiation heat transfer in the embodiment according to the present invention.

FIG. 3 is a perspective view for explaining an arrangement of the first cover or coating layer shown in FIG. 1.

FIG. 4 is a diagram table indicating first to fourth embodiments as well as first and second Comparative examples showing measured values of thermal transmittance at the time of receiving ambient heat.

FIG. 5 is a diagram table indicating first to fourth embodiments as well as first and second Comparative examples showing measured values of thermal transmittance at the time of high power output.

FIG. 6 is a diagram table indicating first to fourth embodiments as well as first and second Comparative examples showing measured values of temperature at the time of high power output.

FIG. 7 is a diagram table indicating first to fourth embodiments as well as first and second Comparative examples showing heat dissipation properties.

FIG. 8 is a cross-sectional view for explaining a dummy cell or battery module.

FIG. 9 is a cross-sectional view for explaining Comparative Example 1

FIG. 10 is a cross-sectional view for explaining the Comparative Example 2.

DETAILED DESCRIPTION

Figure 1:
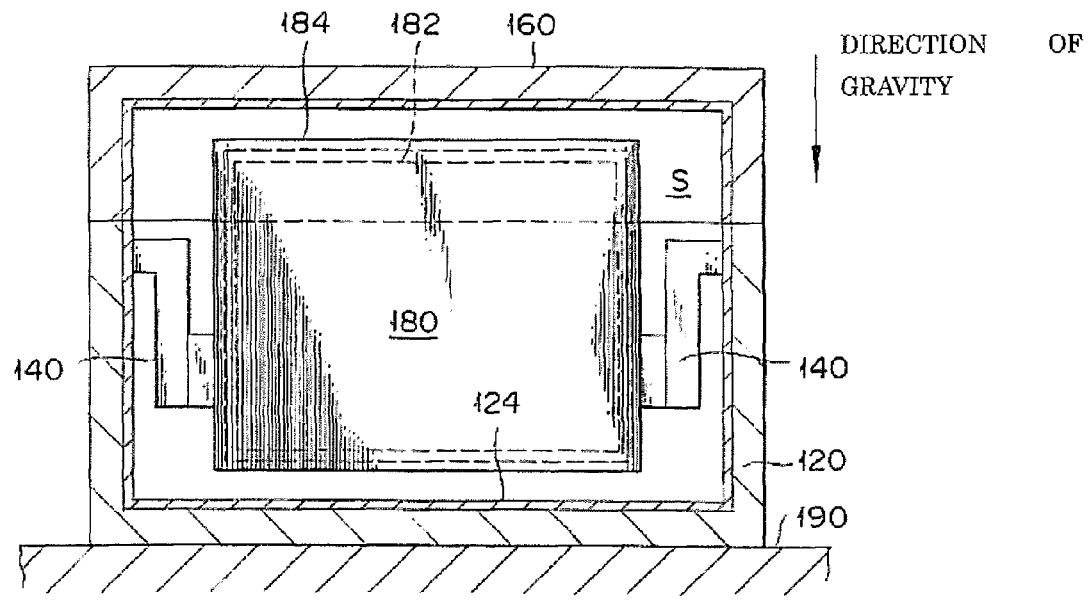
FIG. 1 is a cross-sectional view for explaining a battery case of an embodiment according to the present invention.

FIG. 1 is a cross-sectional view for explaining a battery case according to an embodiment of the present invention, and FIG. 2 is a conceptual diagram for explaining the heat transfer radiation according to the embodiment of the present invention.

A battery case battery 100 pertaining to the embodiment of the present invention is shaped substantially rectangular, is provided with a battery case 120 of recessed shape for receiving a battery module 180, a bracket 140 as supporting mechanism of battery module 180, and a lid portion 160 to form a closed structure, and is used as a power source mounted on a vehicle 190 for example.

Battery module 180 is shaped generally rectangular, and is configured to be composed of a plurality of containers arranged juxtaposed, each accommodating a plurality of cells 182. By connecting cells 182 in parallel or serial, a battery pack is formed corresponding to a desired current, voltage, or capacity. For example, cell 182 is a flat-type lithium-ion secondary battery.

Bracket 140 forms a space S between an outer surface of battery module 180 and an inner surface of battery case 120 through an indirect supporting or fixing structure such that a heat-receiving property of the inner surface of battery case 120 with respect to the heat from the outer surface of battery module 180 (ambient air) is reduced. Therefore, the increase in cell 182 temperature due to the heat-receiving is prevented during non-power generation in the daytime where the ambient air or outside temperature (30° C., for example) is higher than the temperature of cells 182 (20° C., for example) such that thermal degradation of cells 182 during unused time (at non-power generation) is suppressed.

The outer surface of battery module 180 is disposed a first cover layer 184 with a radiation coefficient or emissivity higher than that of the outer surface of battery module 180 while on the inner surface of battery case 120 is disposed a second cover layer 124 of radiation coefficient or emissivity higher than that of the inner surface of battery case 120. First cover layer 184 and second cover layer 124 are opposed to each other through the space S.

First cover layer 184 having an emissivity higher than the emissivity of the outer surface of battery module 180 is disposed on the outer surface of battery module 180 and second cover layer 124 having an emissivity greater than the emissivity of the inner surface of second cover layer 124 is disposed on the inner surface of battery case 120. And second cover layer 124 and first cover layer 184 are opposed through the space S.

As described above, because battery module 180 is supported (indirectly fixed) through bracket 140, the heat transfer between battery case 120 and battery module 180 is dominated by convective heat transfer and radiative heat transfer.

As shown in Equation 1 in FIG. 2, the heat transfer q per unit area by convection heat transfer may be calculated by multiplying the heat transfer coefficient $\alpha 1$ and the value obtained by subtracting the absolute temperature T space of the space S from the absolute temperature T1 (surface) of the outer surface of battery module 180. The heat transfer coefficient $\alpha 1$ is in turn calculated by first multiplying ¼ power of the product of the Grashof number Gr and the Prandtl number Pr, the thermal conductivity $\lambda$ of the space S, and 0.54, and subsequently dividing by the representative length of the heat transfer surface of battery module 180. In other words, the amount of heat transfer q per unit area by convection heat transfer is linearly proportional to the difference between the absolute temperature, and the temperature dependence is thus relatively small.

On the other hand, as shown in Equation 2 in FIG. 2, heat transfer q per unit area due to radiation heat transfer is calculated by multiplying the Stefan-Boltzmann constant and a first value obtained by subtracting fourth power of the absolute temperature T2 of the inner surface of battery case 120 from fourth power of the absolute temperature T1 of the outer surface (surface) of battery module 180, and then dividing this first value by a second value obtained by subtracting 1 from the sum of the reciprocal of the emissivity of the outer surface of battery module 180 $\epsilon 1$ and the reciprocal of the emissivity of the inner surface of battery case 120 $\epsilon 2$. In other words, because the amount of heat transfer q per unit area by radiation heat transfer is calculated by the difference between the fourth powers of the absolute temperatures, the temperature dependence is large.

Because of the presence of first and second cover layers 184 and 124, respectively, due to greater emissivity compared to the substrate, in this embodiment, the heat dissipation at a high temperature due to radiation heat transfer properties will be significantly improved. That is, the heat dissipation of the battery at high temperature, which is subjected to high temperature by heat generated during power generation is improved such that the heat dissipation performance during use (power generation) is ensured. For example, when the temperature of the battery rises by heat generated during power generation and exceeds the outside air temperature (for example, 30° C.) and in accordance with increase in the temperature difference to the outside air temperature, the amount of heat transfer from the outer surface of battery module 180 to the inner surface of battery case 120 increases (in accordance with the difference of 4th power of temperatures) such that a sufficient amount of heat transfer by radiation may be achieved at the temperature of use (e.g., at 60° C.).

Thus, battery case battery 100 is configured, as described above, to reduce the heat receiving properties at the time of non-use while ensuring the heat dissipation performance at the time of use (power generation) such that such battery case battery 100 may be provided that may hold the battery temperature low and suppress the capacity loss of battery or cell due to thermal degradation of cells 182.

FIG. 3 is a perspective view explaining an arrangement of first cover layer 184 shown in FIG. 1. As the portions for first cover layer 184 to be disposed are assumed planes A to F disposed in battery module 180. Surface A and the surface B represent a pair of relatively opposing surfaces. The surface A is a top surface located in the uppermost with respect to the direction of gravity, and the surface B surface is a bottom surface which is located in the lowermost with respect to the direction of gravity. Surfaces C to F are side wall surface that connects the plane A and plane B. Surfaces C and D represent a pair of supporting side surfaces opposing to each other and to which bracket 140 is fixed, and surfaces E, and F represent a pair of non-supporting side surfaces opposing each other and bracket 140 is not attached thereto.

Thus, when all the surfaces A to F (i.e. the entire surface of the outer surface of battery module 180) are disposed with first cover layer 184, and the entire surface of the inner surface of battery case 120 is disposed by second cover layer 124, because emissivity is improved over the entire surface of the inner surface of battery case 120 as well as the entire surface of the outer surface of battery module 180, it is possible to maximize the heat dissipation when used in high temperature.

Further, when first cover layer 184 disposed on the side wall surfaces of battery module 180, and with respect to the direction of gravity, battery case 120 is attached such that the one of the opposing surface portions is positioned above while the other one of the opposing surfaces is positioned below, that is, when surfaces C and D representing the supporting side surface of battery module 180 as well as the surfaces E and F of non-supporting side surfaces are applied with first cover layer 184, because surfaces C to F represent the portions of maximum change in thermal resistance at high temperature with respect to that at low temperature surface, the effects per unit area of application is the highest. In addition, it is preferable to apply first cover layer 184 to the non-supporting side surfaces E and F because that arrangement will be able to suppress interference with the heat dissipation performance due to the presence of bracket 140.

Further, when the one of the pair of the opposing surfaces in battery module 180 is applied with first cover layer 184, and the one of the opposing surfaces applied with first cover layer 184 is positioned above while the other of the opposing surfaces positioned below with respect to the direction of gravity, to arrange battery case 120, that is, when the surface A representing the upper surface of battery module 180 is applied with first cover layer 184, because the surface A represents a portion of the highest temperature, the average temperature may be decreased and the temperature variation from portion to portion (surface to surface) can be reduced such that the effects per surface of the first and second cover layers 184 and 124 will assume the highest.

Note that first cover layer 184 and second cover layer 124 are not limited to the identical shape and/or arrangement. For example, it is possible to be configured in such a way that these are opposed to each other at least partially or partly through the space S. In addition, battery case 120 and battery module 180 are not limited to a generally rectangular shape.

First and second cover layers 184 and 124 are formed by applying a coating material containing a high radiation and performing a baking process. As the high radiation materials, for example, an oxide composite represented by silica (SiO2) or alumina (Al2O3), or a clay mineral such as kaolin may be enumerated. However, first and second cover layers 184 and 124 are not limited to these configurations formed by coating. For example, when the base material or substrate of the outer surface of battery module 180 and the inner surface of battery case 120 is aluminum, by anodizing or chemical processing, forming of a high radiation cover film is possible. Further, it is possible to form first cover layer 184 and second cover layer 124 in different compositions or formed by different processes.

With respect to bracket 140, the mounting form is not particularly limited, and may be disposed on each side surface, or placed on the top surface and the bottom surface, for example, as long as no influence would be exerted on heat transfer between battery case 120 and battery module 180 where heat transfer through heat conduction and heat radiation are dominant.

The lithium-ion secondary battery has a power generating element, an exterior material for sealing the power generating element, and a tub (electrode terminal) derived to the exterior of the exterior material. Power generating element is formed by sequentially stacking a positive electrode plate, negative electrode plate and a separator, sequentially. For example, the positive electrode plate is formed by a positive electrode active material layer consisting of a lithium-transition metal composite oxide such as $LiMn_2O_4$. For example, the negative electrode plate has a negative electrode active material layer consisting of a carbon and lithium-transition metal composite oxide. For example, the separator is formed from porous PE (polyethylene) having an air permeability capable to penetrate the electrolyte.

From the viewpoint of weight reduction and thermal conductivity, the exterior material consists of sheet material such as a polymer-metal composite laminate film in which a metal (including alloys) such as aluminum, stainless steel, nickel, and copper is coated with an insulator such as a polypropylene film, and a part or entire periphery thereof is joined by heat fusion. However, the exterior material is not limited to the sheet material such as a laminate film, a metal case may be employed instead, however.

Now, description is made of a measurement result of heat radiation characteristics of battery case battery 100 in the embodiment according to the present invention. FIG. 4, FIG. 5, FIG. 6, and FIG. 7 show, with respect to first to fourth embodiments as well as first and second Comparative Examples, measured values of thermal transmittance at the time of receiving ambient heat, measured values of thermal transmittance at the time of high power output, measured values of temperature at the time of high power output, and heat dissipation properties, respectively.

FIG. 8 is a cross-sectional view for explaining a dummy cell or battery module. FIGS. 9 and 10 are cross-sectional views for explaining Comparative Examples 1 and 2.

Battery case 120 having a dummy battery module 180A pertaining to the first to fourth embodiments as well as the first and second Comparative Examples, are placed on an insulating material of column shape placed on a table within a room, output of dummy battery module 180A is adjusted and left for a certain time for stable state to be attained, and temperatures on each of surfaces A to F are measured as measurement items. Based on the heat transfer coefficient calculated from the measurement temperatures, the heat radiation characteristics were evaluated. The heat transfer coefficient ($W/(m2 \cdot k)$) is calculated by dividing a power density ($W/m2$) by the value obtained by subtracting the outside air temperature (k) from dummy battery module 180A temperature (k) (see Equation 3 in FIG. 4). Power density ($W/m2$) is calculated by dividing output (W) by area (m2) (see Equation 5 in FIG. 4).

Dummy battery module 180A is an alternative to battery module 180, and as shown in FIG. 8, consists of a box made of aluminum with a rubber heater 182A and an insulating material 186 disposed therein. By controlling a voltage using a variac, rubber heater 182A is simulated for heating state of the battery or cell. Flow rate of the outer surface of battery case battery 100 is assumed to be of a natural convection state assuming the vehicle stopped state in which ambient thermal resistance is maximized. Insulating material 186 is disposed to prevent heat generated in rubber heater 182A to be transmitted to portions other than the outer surface of dummy battery module 180A.

Set temperature are aimed at 40° C. assuming a low temperature region (i.e., ambient or outside temperature) at receiving heat from an outside air temperature and at 70° C. assuming a high power high-temperature region (between 70 to 80° C.) for high power output. Temperatures were controlled by changing output value while holding the output of rubber heater 182A to be the same on each surface. The point in time at which the temperature has stabilized was set at the point at which the difference between temperature of the upper surface of dummy battery module 180A (surface A located in the uppermost with respect to the direction of gravity) and the outside air temperature assumed a steady-state value. This was intended to match the rate of heat dissipation with respect to the heat dissipation amount (output) of rubber heater 182A at each experiment because a part of heat amount generated by rubber heater 182A causes a rise in the temperature of the members that make up dummy battery module 180A until reaching an equilibrium state.

Temperature measurement was performed by attaching a thermocouple to outer surfaces A to F of dummy battery module 180A, inner surface of battery case 120, and outer surface of battery case 120. In addition, the outside air temperature was also measured.

Now, description is made of the configurations of the first to fourth embodiments as well as the first and second Comparative Embodiments used for measurements of heat dissipation properties.

Except for the difference in surfaces to which first and second cover layers 184 and 124 are arranged or disposed, the first through fourth embodiments are substantially the same. First and second cover layers 184 and 124 are formed by applying approximately 30 μm thickness of coating material for heat dissipation (Cooltech CT100©, Okitsumo Co.) and performing a baking process. Note that first cover layer 184 is disposed on surface C representing a supporting side surface in the first embodiment, on all surfaces A to F in the second embodiment, on surfaces E and F representing the non-supporting side surface in the third embodiment, and on the top or upper surface A in the fourth embodiment, respectively. Second cover layer 124 is disposed to oppose first cover layer 184.

Except that, as shown in FIG. 9, first and second cover layers 184 and 124 are not disposed, Comparative Example 1 is substantially the same as the first to fourth embodiments. As shown in FIG. 10, in the second Comparative Example, the bottom surface B is fixed to the inner bottom surface of battery case 120 tightly so that the heat dissipation through heat conduction is dominant.

Figure 7:
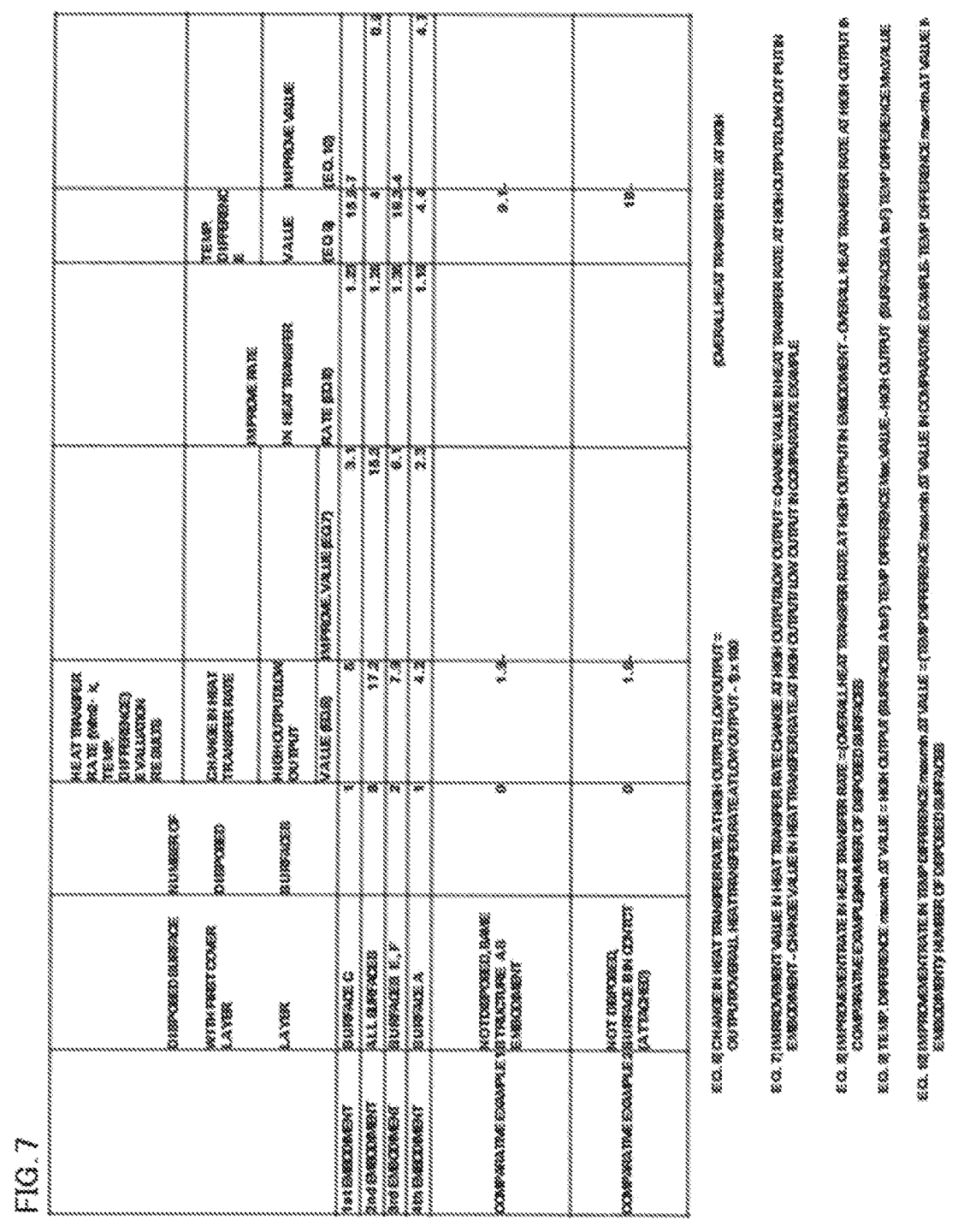

Now description is made of the evaluation results of heat dissipation characteristics. As shown in FIG. 7, the evaluation of heat dissipation characteristics is performed based on the value of change in heat transfer rate at the time of high output with respect to that at the time of low output, improved value thereof, improvement rate in heat transfer rate, and a temperature difference max–min ΔT and improved value thereof.

The value of change in heat transfer rate represents a value expressed in percentage by dividing an overall heat transfer rate at high output by the overall heat transfer rate at low output and subsequently subtracting 1 from the divided value (see Equation 6 in FIG. 7). The overall heat transfer rate is the sum of the heat transfer rates of surfaces A through F (see Equation 7 in FIG. 7). The improved value of the rate of heat transfer rate at high output with respect to that at low output relates to the change of value of heat transfer rate at high output with respect to that for low output and is obtained by subtracting 1 from the values in each of the embodiments (see Equation 7 in FIG. 7).

The improvement rate in heat transfer rate is obtained, after subtracting the overall heat transfer rate at high output in the first Comparative Example from the overall heat transfer rate at high output for each embodiment, dividing the subtraction result by a number of disposed surfaces (see Equation 8 in FIG. 7). The number of disposed surfaces denotes the number of surfaces on which first cover layer 184 is applied or arranged.

The temperature difference max–min ΔT relates the temperature difference among surfaces A to F at high output power and is obtained by subtracting the min. value from the maximum value (see Equation 9 in FIG. 7). The improvement rate in the temperature difference, max–min ΔT relates to the temperature difference max–min ΔT and is obtained by first subtracting the value for each embodiment from the value in the first Comparative Example and subsequently dividing by the number of disposed surfaces (see Equation 10 in FIG. 7).

As shown in FIG. 7, according to the first embodiment (first cover layer 184 is disposed on the side supporting surface C), the changed value for heat transfer rate change during the high power to low output is better than Comparative Example 1, and the improvement value thereof represents the difference of approximately 3 percent. Because the heat transfer q per unit area by radiation heat transfer is considered to be proportional to the fourth power of the absolute temperature difference, the heat transfer rate is indicated as being dependent on the temperature.

That is, when battery module 180 is supported by bracket 140, the heat transfer between battery module 180 and battery case 120 is dominant through convective and radiative heat transfer, the heat transfer may be determined by the sum of the convection heat transfer (Equation 1 in FIG. 2) and radiative heat transfer (Equation 2 in FIG. 2).

Thus, when at receiving heat of outside air (temperature region where heat receiving takes place from ambient air), because the heat transfer effect by radiation is small, the same level of heat transfer rate (heat resistance) is shown as that of Comparative Example 1, while at high output (during use at high temperature), because the radiative heat transfer effects will be larger such that the heat transfer rate is considered to increase compared to Comparative Example 1.

According to the second embodiment (first cover layer 184 on all surfaces A to F), the improvement value of heat transfer rate change value at high output with respect to that for low output represents about 15 points difference and shows the maximum value among the first to fourth embodiments. This is considered in such a way that the improvement over the entire outside surfaces of battery module 180 and the entire inner surface of battery case 120 will maximize the heat dissipation during use at high temperature.

According to the third embodiment (first cover layer 184 disposed on planes E and F is representing a non-supporting side surface), the improvement rate in heat transfer rate is 1.35 points and indicates the maximum value among the first to fourth embodiments. This is due to the surface E and surface F being the surface with large heat transfer rate during use at high temperature and thus representing the portion showing the maximum change in heat resistance at high temperature with respect to that at low temperature. Therefore, the improvement magnitude is the highest. Note that the large heat transfer rate at surfaces E and F during use at high temperature is considered to be the effects of great heat rise (convection heat transfer) in addition to the radiative heat transfer.

According to the fourth embodiment (top surface, A is disposed with first cover layer 184), the improvement value in temperature difference, max−min ΔT is about 5° C., and thus indicates the maximum value among the first to fourth embodiments. Surface A is a surface with low heat transfer rate during use at high temperature (at high output) and thus is considered to be the surfaces whose temperature will be high due to heat increase (convection heat transfer) such that the improvement level in temperature variations among surfaces is the greatest.

As described above, in the present embodiments, because a cover layer having an emissivity or radiation coefficient higher than that of the associated base material is provided between the outer surface of battery module 180 and the inner surface of battery case 120, the heat dispassion property is increased and the battery or cell subject to high temperature due to heat by power generation may secure the dissipation performance. In addition, a space is formed between the outer surface of battery module 180 and the inner surface of battery case 120 is provided so as the heat receiving property is reduced. Thus, the increase in cell temperature due to heat received during the day time where the ambient temperature is higher than the battery temperature during non-use. Therefore, by securing dissipation performance during use (power generation) while reducing the heat receiving property during non-use (no power generation), the temperature of battery or cell may be held low and battery case 120 or an attachment structure of battery to the battery case may be provided, which is capable of suppressing battery capacity decrease due to thermal degradation.

Further, when first cover layer 184 and second cover layer 124 are disposed on the entire outer surface of battery module 180 and the entire inner surface of cells 182 first, respectively, the entire surface emissivity is improved over the entire surface of the inner surface of battery case 120 and the entire surface of the outer surface of battery module 180, it is possible to maximize the heat dissipation when used in high temperature.

When arranging first cover layer 184 to the wall surface portion of battery module 180, and with respect to the direction of gravity, battery case 120 is configured such that one of the opposing surfaces is positioned above and the other positioned below, the wall surface disposed by first cover layer 184 represents the portion of maximum change in thermal resistance at high temperature with respect to that at low temperature, the effects per unit area of application will be the highest. In addition, when first cover layer 184 is disposed on the non-supporting surface of the wall surface portions, interference with dissipation performance will be preferably avoided due to the presence of the bracket.

When first cover layer 184 is arranged on the one of a pair of the opposing surfaces of battery module 180, and with respect to the direction of gravity, the one of the opposing surfaces applied with first cover layer 184 is positioned above while the other one of the opposing surfaces is positioned below to configure battery case 120, because the one of the pair of the surfaces represents the position at the highest temperature, the average temperature may be decreased with the variations in temperature among positions (surfaces) being reduced so that the effects per unit area of first and second cover layers 184 and 124 will be the highest.

When configuring battery module 180 by arranging side by side, depending on disposing cells in series and/or parallel fashion, a battery pack with a desired current, voltage, and capacity may be formed.

The present invention is not limited to the specific embodiments described above. Rather, within the scope of claims, various alterations or modifications are possible. For example, battery module 180 is not limited to the configuration in which a plurality of containers housing a plurality of cells are disposed side by side, but is applicable to the configuration in which the cell is not accommodated within a container. In this case, for example, the exterior material is disposed with first cover layer 184. In addition, battery case battery 100 is not limited to the configuration for mounting to a vehicle. Further, the battery is not limited to a lithium-ion secondary battery, but is applicable to a nickel hydrogen secondary battery as well.

The invention claimed is:

1. A battery case which houses a battery module having a plurality of cells, the battery module defined by opposing XY surfaces, opposing YZ surfaces, and opposing XZ surfaces, wherein X, Y and Z define directional planes, the battery case comprising:
    a first cover layer disposed on and covering an entire outer surface of at least one of the opposing XY surfaces, opposing YZ surfaces, and opposing XZ surfaces of the battery module, the first cover layer having a higher thermal radiation emissivity than the thermal radiation emissivity of the outer surface of the battery module;
    an outer case having a second cover layer, wherein the second cover layer is disposed on and covering an entire inner surface of the outer case opposing the first cover layer, the second cover layer having a higher thermal radiation emissivity than the thermal radiation emissivity of the inner surface of the outer case; and
    a supporting mechanism connecting the battery module to the outer case and configured to support the battery module within the outer case such that the first cover layer and the second cover layer are opposed to each other and form an air space configured to dissipate heat.

2. The battery case as claimed in claim 1, wherein the first cover layer is disposed on and covers the entire outer surface of all of the opposing XY surfaces, opposing YZ surfaces, and opposing XZ surfaces of the battery module and the second cover layer is disposed on and covers all inner surfaces of the outer case.

3. The battery case as claimed in claim 1, wherein the battery module is configured to be composed of a plurality of containers side by side and each housing a plurality of cells.

4. The battery case as claimed in claim 1, wherein one of the opposing YZ surfaces is a top surface, and the first cover layer is disposed on and covers the top surface.

5. The battery case as claimed in claim 1, wherein the first cover layer is disposed on and covers each of the opposing XY surfaces and the opposing XZ surfaces.

6. The battery case as claimed in claim 1, wherein the first cover layer is disposed on and covers both of the opposing XY surfaces and the supporting mechanism comprises two brackets, each bracket connected to one of the opposing XZ surfaces, respectively.

7. The battery case as claimed in claim 1, wherein the supporting mechanism is configured to suspend the battery module within the outer case and comprises two brackets each connecting one of opposing surfaces XY or one of opposing surfaces XZ to an opposing surface of the outer case.

8. A mounting structure to a battery case that accommodates a battery module having at least one cell, the battery module defined by opposing support surfaces, opposing non-support surfaces and opposing top and bottom surfaces, the mounting structure comprising:

a first cover layer disposed on and covering an entire outer surface of one or both of the opposing non-support surfaces of the battery module, the first cover layer having a higher thermal radiation emissivity than the thermal radiation emissivity of the outer surface of the battery module;

an outer case comprising a second cover layer disposed on an entire inner surface of the case that opposes the first cover layer, the second cover layer having a higher thermal radiation emissivity than the thermal radiation emissivity of the inner surface of the case; and a supporting mechanism comprised of two brackets, each bracket connecting one of the opposing support surfaces respectively, with an opposing part of the outer case, the supporting mechanism creating an air space between the first layer and the second layer configured to dissipate heat.

9. The mounting structure as claimed in claim 8, wherein the wall surface has a supporting side surface on which the supporting mechanism is attached and a non-supporting surface on which the first cover layer is disposed.

10. The mounting structure as claimed in claim 8, wherein the battery module is configured by arranging a plurality of containers side by side, each container housing a plurality of cells.

11. A mounting structure to a battery case having a sealed structure that accommodates a battery module having at least one cell, the mounting structure comprising:

a first cover layer configured to be disposed on all outer surfaces of the battery module and having a higher thermal radiation emissivity than the thermal radiation emissivity of the outer surface of the battery module; and an outer case comprising a second cover layer disposed on an entire inner surface of the outer case, the second cover layer having a higher thermal radiation emissivity than the thermal radiation emissivity of the inner surface of the case, wherein the first cover layer and the second cover layer are opposed to each other across a space maintained by a supporting mechanism connected between the outer case and the battery module.

12. The mounting structure as claimed in claim 11, wherein the battery module is configured by arranging a plurality of containers side by side, each container housing a plurality of cells.

* * * * *